Patented May 26, 1936

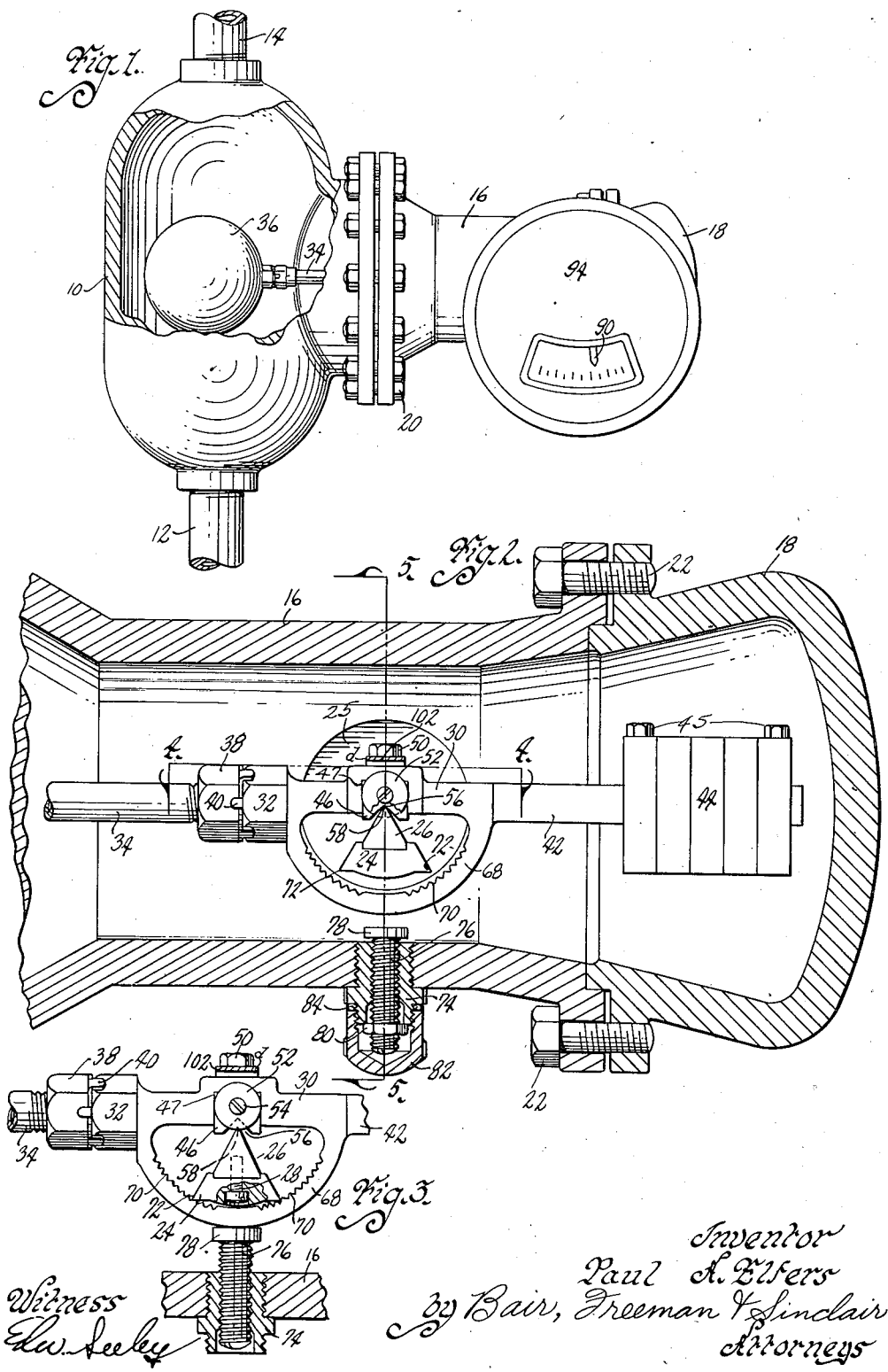

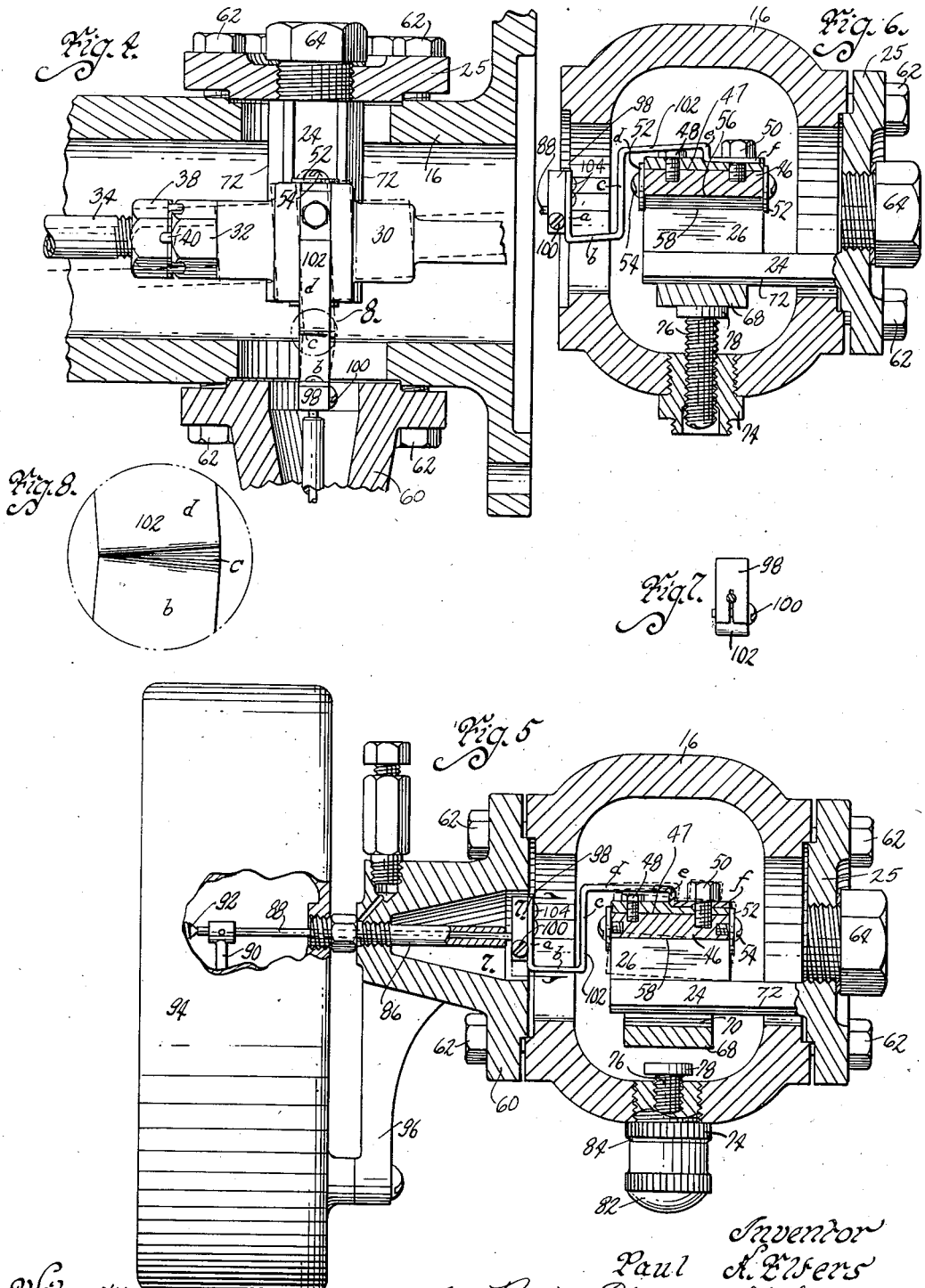

2,041,997

UNITED STATES PATENT OFFICE 2,041,997

LIQUID LEVEL RESPONSIVE DEVICE

Paul A. Elfers, Marshalltown, Iowa, assignor to Fisher Governor Company, Marshalltown, Iowa, a corporation of Iowa Application December 2, 1935, Serial No. 52,621

11 Claims. (Cl. 137—68)

An object of my invention is to provide a liquid level responsive control device for either operating control valves or indicating devices or the like, which has a number of decided advantages as will hereinafter appear, and which is of comparatively simple, durable and inexpensive construction.

A further object is to provide a device of the character disclosed, in which a float arm is mounted within a float arm housing by a substantially friction free mounting consisting of a knife-edge bearing, means being provided for separating the elements of the knife-edge bearing and rigidly supporting the float arm for shipping and/or installation purposes.

Another object is to provide in connection with an oscillatable transmission element designed for operation with minimum friction, an operative connection between the float arm and the control transmission element, which eliminates all binding of the parts and yet compensates for any slight misalignment, while at the same time accurately transmitting the movement of the float arm to the transmission element.

Another object is to provide a means to counterbalance the float arm mounted within the float arm housing, so that the weight of the counterbalance means is not imposed upon the transmission element.

With these and other objects in view, my invention consists in the construction, arrangement and combination of the various parts of my liquid level responsive device, whereby the objects contemplated are attained, as hereinafter more fully set forth, pointed out in my claims, and illustrated in the accompanying drawings, in which:

Figure 1 is a side elevation of a liquid level responsive control device embodying my invention, showing part of the float cage broken away, and the wall thereof shown in section in order to illustrate the float within the float cage.

Figure 2 is an enlarged, vertical, sectional view through the counter-balance end of the float arm housing.

Figure 3 is a view similar to the central portion of Figure 2 showing the parts in a different position.

Figure 4 is a horizontal, sectional view on the line 4—4 of Figure 2.

Figure 5 is a vertical, sectional view on the line 5—5 of Figure 2.

Figure 6 is a sectional view, similar to Figure 5, showing the parts in the position of Figure 3.

Figure 7 is a sectional view on the line 7—7 of Figure 5; and

Figure 8 is an enlarged view of the portion of Figure 4 within the circle 8, showing a leaf spring connection in a twisted position.

Heretofore in the construction of float type liquid controls and indicators, fairly large diameter rotary stems were provided. These stems were packed and the action of the float was therefore necessarily sluggish, due to the friction in the packing.

For sensitive controls or indicators, that is those which must respond accurately to the level of the liquid, such an arrangement is unsatisfactory and in my present invention, I have therefore endeavored to eliminate virtually all friction, in order to have the float arm accurately transmit motion to a transmission element extending to the exterior of the float arm housing.

To accomplish this result, I provide a number of features, which will be enumerated as the description of my invention proceeds.

On the accompanying drawings, I have used the reference numeral 10 to indicate a float cage. This may have the usual piping connections at 12 and 14. I provide a float arm housing including a portion 16 and an end cap 18, which portion and cap are suitably secured together, as by cap screws 22, with gaskets (not shown) interposed between them. The float arm housing is secured to the float cage 10 although it may obviously be secured to a tank or the like with the float arm projecting into the tank. Within the float arm housing I provide a knife-edge bearing supporting arm 24, projecting from a closure plate 26. The top of the arm 24 is milled to receive the base of a knife-edge element 26, secured in position as by screws 28. (See Figure 3.)

A float arm consisting of a casting 30 and a rod-like extension 34 is provided. The extension 34 is screwed into a boss 32 of the casting 30 and a float ball 36 is mounted on the outer end of the extension 34. A lock nut 38 and a lock washer 40 are provided for positively retaining the extension 34 in position with respect to the boss 32.

The casting 30 has a weight arm 42 on which a counterweight 44 is mounted. The counterweight may consist of a plurality of weights, the proper number being used to secure counterbalancing of the ball 36, and these weights may be moved toward or away from the pivotal axis to further accurately secure proper counter-balancing.

Set screws 45 are provided for holding the counter-weight in position.

A V block 46 is mounted in a milled slot 47 of the casting 30 and secured in position as by cap screws 48 and 50. Guide washers 52 are secured to the ends of the V block by screws 54. The V block has the bottom 56 of its notch normally resting on the knife-edge 58 of the element 26, as shown in Figures 2 and 5.

An end plate 60 is mounted on the float arm housing 16 opposite the end plate 25. The plates 25 and 60 may be secured in position by cap screws 62, and suitably gasketed. The end plate 25 is preferably provided with a removable plug 64.

The sections 30 is provided with an arcuate portion 68, which is serrated with teeth 70. The knife-edge support 24 has a pair of corners, indicated at 72, which are normally out of contact with the teeth 70, but are adapted to engage the teeth under certain conditions as will hereinafter appear.

In the bottom of the float cage portion 16, I mount a sleeve 74 in which is threaded a cap screw 76. The cap screw 76 is directly below the arcuate portion 68 and is provided with a head 78 to prevent excess movement outward of the set screw. The lower end of the set screw is provided with a screw driver slot, whereby the set screw may be rotated, and the set screw is normally locked in position by a lock nut 80.

The lock nut 80 is then enclosed with a cap 82, which prevents the escape of pressure, a gasket 84 being interposed between the cap and the fitting 74.

A sleeve 86 is mounted in the end plate 60 and an oscillatable transmission element or stem 88 extends through the sleeve. The transmission element and the bore of the sleeve are machined to a very high degree of accuracy, the sleeve being sufficiently long so that the capillary action of liquid between the stem surface and the inside surface of the sleeve is sufficiently high to act as a perfect seal, preventing leakage, yet the slight clearance between them allows perfect movement of the stem in a rotary manner without appreciable friction.

These parts, however, form no part of my present invention, but are parts which are available on the market, and which work in nicely with my construction.

The stem 88 is adapted for controlling either an indicator needle 90 of a gauge 94 or any other mechanism, such as air valves and the like.

A thrust bearing 92 is usually provided in connection with a stem of the character shown for the purpose of counter-acting the outward thrust on the stem produced by internal pressure in the float cage.

I provide a novel type of operative connection between the stem 88 and the float arm casting 30, including a clamp block 98, which is split as shown in Figure 7, and secured by a screw 100 on the inner end of the stem 88. A leaf spring 102 is connected with the block 98 and is bent in a tortuous path, indicated by the reference characters $a$, $b$, $c$, $d$, $e$ and $f$.

The portion $c$ extends substantially at right angles to the pivotal axis of the knife-edge bearing and the axis of the stem 88, which axes incidentally are preferably in alignment with each other, although the leaf spring 102 will operate satisfactorily and compensate for any slight misalignment of one of these axes relative to the other.

The inner end $f$ of the leaf spring 102 is secured to the float arm by the cap screw 50, the outer end $a$ thereof, being secured to the block 98 by rivets or the like 104.

By adopting the type of stem shown at 88, friction is minimized at the point where the stem extends from the interior to the exterior of the float cage, whereas ordinary packing at this point produces considerable friction.

The leaf spring 102 due to the fact that it is flexible, and also partly to its shape, accurately transmits motion of the float arm to the stem without any binding of the parts.

If the float arm is swung sidewise as shown dotted in Figure 4 or tipped as shown dotted in Figure 5, then the leaf spring will twist, as illustrated in Figure 8 or as shown by dotted lines in Figure 5.

By providing a knife-edge support for the float arm, one of sufficient strength for the heavy float arm, the float and the counter-weight is provided, yet one which is substantially friction free.

The elements 26 and 46 may be of hardened and/or corrosion resistant steel or the like, so as to eliminate wear, and yet maintain the relative sharpness of the knife-edge contact.

By enclosing the counter-weight 44 within the float arm housing, its weight is entirely carried by the knife-edge bearing without putting any strain on the stem 88 or the connecting spring 102, whereas in present day construction, the counter-weight is usually mounted outside of the float cage.

The normal operation of the float, its movement being transmitted to the stem 88, I believe is obvious from the foregoing description.

When the invention is installed, necessarily in the upright position shown in Figure 1, it will operate properly, and the indicator 90 will respond accurately to the level of the liquid within the float cage, since every effort has been made to reduce friction to a minimum.

During shipping and installation, however, there is likelihood of the element of the knife-edge bearing becoming separated and displaced, and the spring 102 distorted to an undesirable shape.

Therefore when the device is prepared for shipping and/or for installation, the cap 82 is removed, and the set screw 76 set up to the position shown in Figure 3, after which the cap is replaced. This causes the teeth 70 of the arcuate portion 68 of the casting 30 to engage the corners 72 of the knife bearing arm 24, so as to rigidly position the float arm relative to the float cage.

The arcuate portion 68 is of considerable width as shown in Figure 6, wherein the set screw is set up as described to prevent any movement whatsoever of the float arm after the set screw 60 is tightened. The serrated teeth 70 permit locking of the float arm by the set screw regardless of the angular position of the float arm relative to the horizontal axis of the float arm housing.

When in the position of Figures 3 and 6, the knife edge element 26 is still between the guide washers 52, so that subsequently when the set screw is loosened, and the float arm lowered to its normal position shown in Figures 2 and 5, after the float cage is installed in position, it will properly seat on the element 26.

The spring 102 will flex sufficiently to permit the position of Figure 6 to be assumed by the float arm, the spring then being in the position illustrated in that figure, this position being below the elastic limit of the spring, so that it is not permanently distorted.

Some changes may be made in the arrangement and construction of the various parts of my liquid level responsive device without departing from the real spirit and purpose of my invention, and it is my intention to cover by my claims, any modified forms of structure or use of mechanical equivalents, which may be reasonably included within their scope.

I claim as my invention:

1. In a liquid level responsive device, a float arm housing, a float arm, a float thereon, a substantially friction free pivotal mounting for said float arm, comprising a knife-edge bearing, counterbalance means within said float arm housing for said float arm and float, an oscillatable motion transmission element extending from the interior to the exterior of said float arm housing and arranged with its axis of oscillation substantially in alignment with the pivotal axis of said pivotal mounting, means for transmitting movement of said float arm to said transmission element, comprising a leaf spring of tortuous shape, and means for locking said float arm in a rigid position with the elements of said pivotal mounting separated, comprising an arcuate serrated element on said float arm, a projection on said float arm normally spaced therefrom, and means engageable with said arcuate element and operable to engage the teeth thereof with said projection.

2. In a liquid level responsive device, a float arm housing, a float arm, a float thereon, a substantially friction free pivotal mounting for said float arm, comprising a knife-edge bearing, counterbalance means within said float arm housing for said float arm and float, an oscillatable transmission element extending from the interior to the exterior of said float arm housing and arranged with its axis of oscillation substantially in alignment with the pivotal axis of said pivotal mounting, means for transmitting movement of said float arm to said transmission element, comprising a leaf spring of tortuous shape having a portion extending at substantially right angles to said axes, and means for locking said float arm in a rigid position with the elements of said pivotal mounting separated, comprising a set screw engageable with said float arm to move it to a position engaging a portion of said float arm housing.

3. In a liquid level responsive device, a float arm housing, a float arm, a float thereon, a substantially friction free pivotal mounting for said float arm, an oscillatable transmission element extending from the interior to the exterior of said float arm housing and arranged with its axis of oscillation substantially in alignment with the pivotal axis of said pivotal mounting, means for transmitting movement of said float arm to said transmission element, comprising a leaf spring, and means for locking said float arm in a rigid position with the elements of said pivotal mounting separated, comprising an arcuate serrated element on said float arm, a projection on said float arm housing normally spaced therefrom, and a set screw engageable with said arcuate element and operable to engage the teeth thereof with said projection.

4. In a liquid level responsive device, a float arm housing, a float arm, a float thereon, a substantially friction free pivotal mounting for said float arm, comprising a knife-edge bearing, an oscillatable transmission element extending from the interior to the exterior of said float cage and arranged with its axis of oscillation substantially in alignment with the pivotal axis of said pivotal mounting, means for transmitting movement of said float arm to said transmission element, and means for locking said float arm in a rigid position with the elements of said pivotal mounting separated, comprising means carried by said float arm housing and engageable with said float arm to move it to a position engaging a portion of said float arm housing.

5. In a liquid level responsive device, a float arm housing, a float arm, a float thereon, a substantially friction free pivotal mounting for said float arm, comprising a knife-edge bearing, an oscillatable transmission element extending from the interior to the exterior of said float arm housing and arranged with its axis of oscillation substantially in alignment with the pivotal axis of said pivotal mounting, means for transmitting movement of said float arm to said transmission element, and means for locking said float arm in a rigid position with the elements of said pivotal mounting separated, comprising an arcuate serrated element on said float arm, a projection on said flat arm housing normally spaced therefrom, and means engageable with said arcuate element and operable to engage the teeth thereof with said projection.

6. In a liquid level responsive device, a float arm housing, a float arm, a float thereon, a substantially friction free pivotal mounting for said float arm, an oscillatable transmission element extending from the interior to the exterior of said float arm housing and arranged with its axis of oscillation substantially in alignment with the pivotal axis of said pivotal mounting, means for transmitting movement of said float arm to said transmission element, comprising a leaf spring, and means for locking said float arm in a rigid position with the elements of said pivotal mounting separated.

7. In a liquid level responsive device, a float arm housing, a float arm, a float thereon, a substantially friction free pivotal mounting for said float arm, comprising a knife-edge bearing, an oscillatable transmission element extending from the interior to the exterior of said float arm housing and a leaf spring for transmitting movement of said float arm to said motion transmission element, said leaf spring having one end connected with said float arm and its other end connected with said motion transmission element.

8. In a liquid level responsive device, a float arm housing, a float arm, a float thereon, a substantially friction free pivotal mounting for said float arm, comprising a knife-edge bearing, counterbalance means within said float arm housing for said float arm and float, an oscillatable transmission element extending from the interior to the exterior of said float arm housing and arranged with its axis of oscillation substantially in alignment with the pivotal axis of said pivotal mounting, and means for transmitting movement of said float arm to said transmission element, comprising a leaf spring of tortuous shape.

9. In a liquid level responsive device, a float arm housing, a float arm, a float thereon, a substantially friction free pivotal mounting for said float arm, movable transmission element extending from the interior to the exterior of said float cage, and means for transmitting movement of said float arm to said transmission element comprising a leaf spring.

10. In a liquid level responsive device, a float arm housing, a float arm, a float theren, a substantially friction free pivotal mounting for said float arm, movable transmission element extending from the interior to the exterior of said float arm housing and arranged with its axis of movement substantially in alignment with the pivotal axis of said pivotal mounting, and means for transmitting movement of said float arm to said transmission element, comprising a leaf spring of tortuous shape.

11. In a liquid level responsive device, a float arm housing, a float arm, a float thereon, a substantially friction free pivotal mounting for said float arm, comprising a knife-edge bearing, counterbalance means within said float arm housing for said float arm and float, an oscillatable transmission element extending from the interior to the exterior of said float arm housing and arranged with its axis of oscillation substantially in alignment with the pivotal axis of said pivotal mounting, means for transmitting movement of said float and float arm to said transmission element, comprising a leaf spring of tortuous shape, and means for locking said float rod operating mechanism in a rigid position with the elements of said pivotal mounting separated.

PAUL A. ELFERS.